Oct. 8, 1968  R. R. REDDY  3,404,864
ROTARY VALVE WITH CONCAVE SEATING SURFACE
Filed Dec. 27, 1966  3 Sheets-Sheet 2

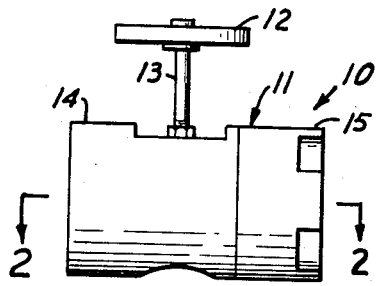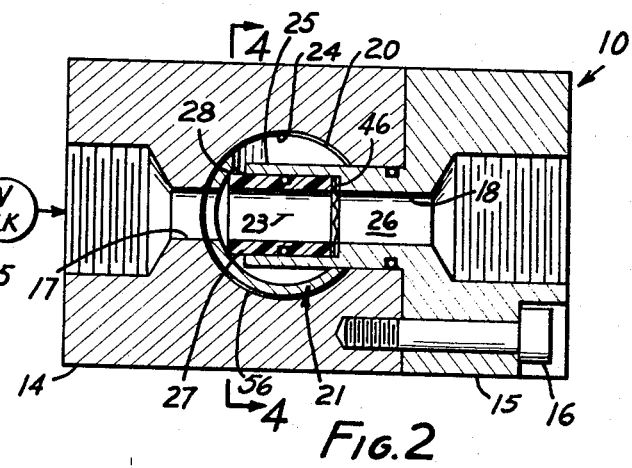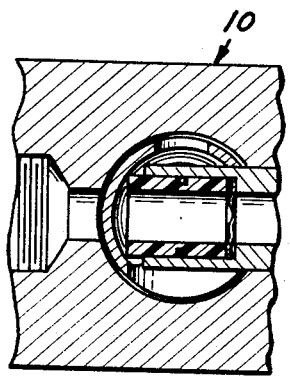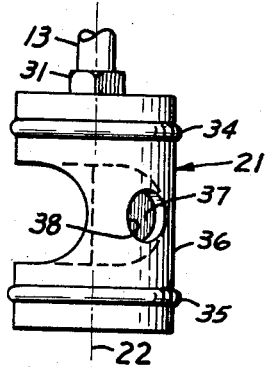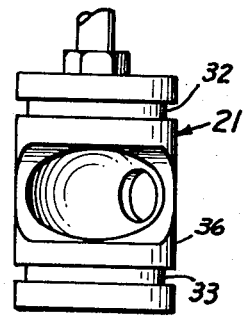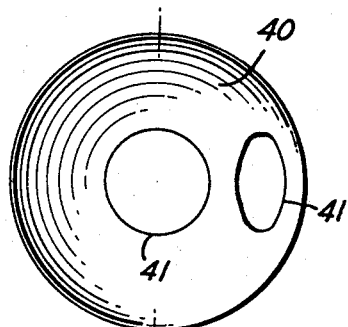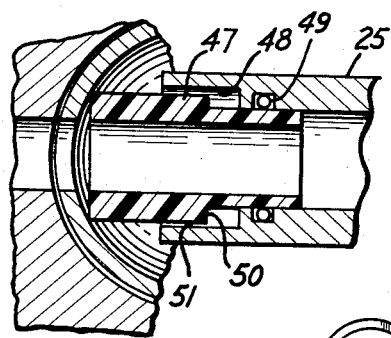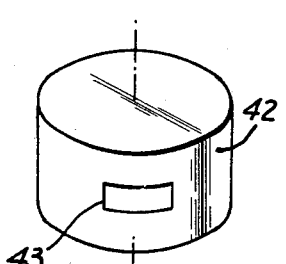

INVENTOR.
ROBERT R. REDDY
BY Angus & Mon
ATTORNEYS.

Oct. 8, 1968     R. R. REDDY     3,404,864

ROTARY VALVE WITH CONCAVE SEATING SURFACE

Filed Dec. 27, 1966     3 Sheets-Sheet 3

INVENTOR.
ROBERT R. REDDY

BY *Angus & Mon*
ATTORNEYS.

United States Patent Office 3,404,864
Patented Oct. 8, 1968

3,404,864
ROTARY VALVE WITH CONCAVE
SEATING SURFACE
Robert R. Reddy, 1195 Michillinda Blvd.,
Pasadena, Calif. 91107
Continuation-in-part of application Ser. No. 551,270,
May 19, 1966. This application Dec. 27, 1966, Ser.
No. 613,697
21 Claims. (Cl. 251—172)

ABSTRACT OF THE DISCLOSURE

This invention relates to a valve for controlling fluid streams. A valve according to the present invention comprises a body having a cavity with an inlet port and an outlet port connected thereto. A valve operator is rotatably mounted in the cavity. A valving wall is carried on the operator and is a concave surface of revolution that is centered on the axis of rotation of the operator. A valve seal, mounted to a valving tube, includes a peripheral contact surface which is congruent to and continuously in contact with the concave surface of the valving wall in all permissible angular positions of the valve operator. One port is in fluid communication with the valving tube and the other port is in fluid communication with the cavity. Either port may be used for the intake port. When one port serves as the intake, fluid under pressure is admitted into the cavity to bias the seal towards the valving wall, thereby preventing fluid flow from one port to the other except when a valve port through the valving wall is in fluid communication within the contact surface of the seal. When the other port is used as the intake, the cavity is relieved to the exhaust port and a separate bias means may bias the seal towards the valving wall.

Specification

This application is a continuation-in-part of copending patent application Ser. No. 551,270, filed May 19, 1966, now abandoned, for "Valve," by Robert R. Reddy, and assigned to the same assignee as the instant application.

A valve of simple construction which can handle fluids at relatively high rates of flow, relatively high pressures, and over relatively wide temperature ranges, has always been an objective of inventive designers. In general, existing valves have been plagued with the problems of requiring large operating forces to change the valve from its open to its closed position and vice versa, or from critical seal requirements, all of which made the valve difficult or expensive to build, have restricted their ranges of usefulness, and, should complete reliability be desired, have required excessively close tolerances.

It is an object of this invention to provide a valve which can be operated by the turning of a valve operator wherein the loads exerted by the fluid stream being controlled aid in making the seal, and in which the internal loads are sufficiently well balanced that only a very low level of force needs to be exerted in order to operate the valve. Furthermore, depending upon selection of design or objectives, some selected ones of the potentialities of the valve may be provided, at a saving over the cost of a valve which provides all of them.

A valve according to this invention comprises a body which has an internal cavity with an inlet port and outlet port connecting thereto. A valve operator is rotatably mounted in this cavity and it is rotatable around an axis of rotation. A peripheral wall is formed on the operator, which peripheral wall is modified by the inclusion of a valving wall which forms a valving cavity in the peripheral wall. The valving wall is a concave surface of revolution that is centered on the axis of rotation of the valve operator. A valving tube extends from one of the said ports into the valving cavity and comprises a tube that is mounted in the body, the tube having a passage in fluid communication with its respective port. A valve seal is mounted to the valving tube and includes a peripheral contact surface which is congruent to and continuously in contact with the valving wall in all angular positions of the valve operator. A valving port enters the valving cavity through the peripheral wall and the valving wall. When one port serves as the intake, fluid under pressure is admitted to the valving cavity so as to bias the contact surface toward the valving wall, thereby to prevent fluid flow from one port to the other except when the valving port is in fluid communication with the contact surface. When the other port is used as the intake, the valving cavity is relieved to the exhaust port and the seal may be biased towards the valving wall by a bias means.

Another object of this invention is to provide a method of forming a toroidal concave valving wall in the valve operator.

According to a preferred but optional feature of the invention, the valving tube is slidably mounted to said body and is adapted to be fluidly forced against the valving wall by biasing means.

The method of forming a concave toroidal surface in a valve operator, which surface is intended to be abutted by the full peripheral contact surface of a valve seal as the valve operator is rotated about its axis, utilizes a cutting tool having a plurality of coplanar points equidistant from a tool axis. The axis of the tool is aligned perpendicular to the axis of the valve operator, which axes intersect at a center point. The tool is rotated about its axis as the valve operator is rocked about its axis. The tool is pressed against the valve operator and cuts a surface in said valve operator. The tool is advanced until the plane of the cutting points passes through the center point and the cutting points are at a distance from the center point equal to a desired major radius for the toroidal surface.

The above and other features of this invention will be fully understood from the following detailed description and the accompanying drawings, in which:

FIG. 1 is a side elevation of the presently preferred embodiment of the invention;

FIG. 2 is a cross-section taken at line 2—2 of FIG. 1;

FIG. 3 is a view of FIG. 2 with a portion thereof rotated;

FIG. 4 is an end view of a portion of FIG. 3 taken at line 4—4 thereof;

FIG. 5 is a side elevation of the valve operator in FIG. 2;

FIG. 6 is a left hand elevation of FIG. 5;

FIGS. 7 and 8 are perspective views of geometric shapes illustrating features of the invention;

FIGS. 9 through 14 are fragmentary axial cross-sections showing modifications of the device of FIGS. 1 and 2;

Figure 10:
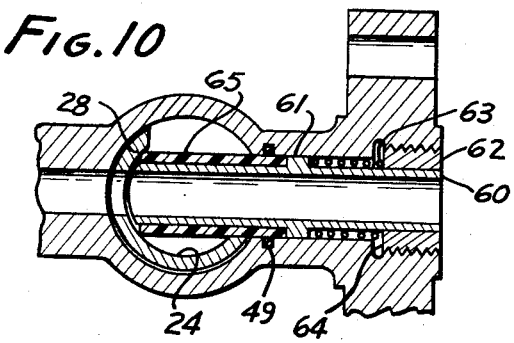

The presently preferred embodiment of the invention is shown in FIG. 1 wherein a valve includes a body 11, a handle 12, and a stem 13 attached to the handle and rotatable thereby. The body includes a first section 14 and a second section 15 which are held together by appropriate bolts 16. An inlet port 17 and an outlet port 18 are formed through respective sections 14 and 15.

Internally of the body in the first section there is formed a cavity 20 which receives a valve operator 21, this valve operator being rotatably mounted around its own axis of rotation 22. This axis of rotation is centered on point 23 as shown in FIG. 2, which axis is vertical to the sheet of FIG. 2 at that point. Cavity 20 is bounded by a bounding wall 24 through which the inlet port passes.

A tube 25 is connected to the outlet port and forms an extension of the second body section 15 and projects into cavity 20. This tube has a central passage 26 within which there is disposed a valving tube 27 having on its free end a continuous peripheral contact surface 28 which lies in a plane normal to the axis of the tubes and projects through cavity 20 to the opposite side of point 23.

Fluid preferably enters from the left-hand end of the body and is controlled by turning handle 12 and stem 13 which adjusts the position of valve operator 21. When fluid is admitted to the device from the left-hand end, fluid under pressure is admitted to the cavity to bias contact surface 28 against valve operator 21, thereby preventing fluid flow from the left-hand port to the right-hand port except when the port through the valve operator is in fluid communication within contact surface 28. When fluid is admitted to the device from the right-hand end, the cavity is in fluid communication with the left-hand port, and is therefore at a reduced pressure when the valve operator is in a closed position. Biasing means 46 may be provided for biasing contact surface 28 against the valving wall of valve operator 21.

Valve operator 21 is best shown in FIGS. 5 and 6. Handle 12 is mounted thereto and held in place by nut 31. A pair of O-ring grooves 32, 33 are formed on the outside of the valve operator, and a pair of O-rings 34, 35 are respectively fitted in grooves so as to make a fluid seal with the wall of the cavity on opposite axial sides of inlet port 17.

It will now be seen that valve operator 21 is rotatably mounted around said axis of rotation. It has an external peripheral wall 36 which is bathed by fluid from the inlet port.

This peripheral wall is modified by a valving wall 37 which is sunk in the peripheral wall and includes a region which is a concave surface of revolution centered on the said axis of rotation. The preferred surface is that which is shown, namely a surface which is generated by the rotation of a circular arc around the center of rotation. The surface is therefore toroidal or spherical, depending on the radius of the arc. A valving port 38 passes through the valving member between walls 36 and 37 near one edge of the valving wall.

The contact surface 28 is congruent with the valving wall. This feature is illustrated by FIG. 7 wherein a spherical surface 40 is shown intersected by a circle 41 which comprises the intersection of a plane with the spherical surface. A toroidal surface has the same properties. By extension, FIG. 8 shows a cylindrical surface 42 with a warped quadrilateral surface 43 intersecting it to form a continuous boundary on the cylindrical surface. These constitute two examples of continuous surfaces which will remain in contact with the surface of revolution. The provision of a valving surface developed by a circular arc and an intersecting peripheral contact surface 28, which is circular, is at once the simplest, the easiest to manufacture, and most accurate set of surfaces. However, this invention is broad enough to encompass other classes of surfaces.

Figure 15:
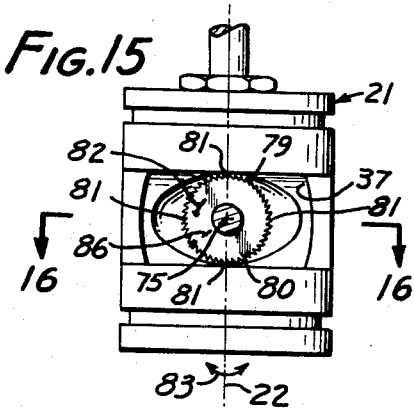
FIG. 15 is a view as in FIG. 5 illustrating the presently preferred method of forming a valving wall on the valve operator.
Figure 16:
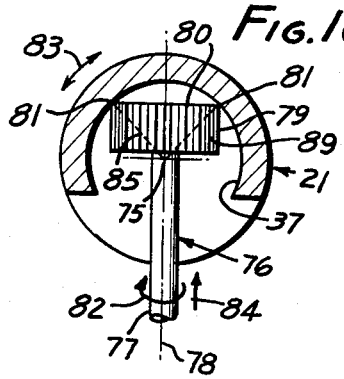
FIG. 16 is a cross-section taken at line 16—16 of FIG. 1.

FIGS. 15 and 16 illustrate the preferred method of forming valving wall 37. Valve operator 21 is positioned for rotation about its axis 22. Axis 22 is positioned to pass through center point 75, which is the center of generation of toroidal valving wall 37. Cutting tool 76 is provided with a shaft 77 for rotation about axis 78. Axis 78 is positioned to pass through center point 75 perpendicular to axis 22. Cutting tool 76 is provided with a cutting bit 79 having a polygonal face 80. Points 81 between each side of polygonal face 80 form the cutting point against the valve operator. Polygonal face 80 generates a circle at its cutting edge with its cutting teeth 87 extending axially along the side of bit 79. Cutting points 81 are equidistant from axis 75.

Cutting bit 79 is rotated about axis 78 as indicated by arrow 82 and valve operator 21 is "rocked" about axis 22 as indicated by arrow 83.

The cutting tool is brought against the valve operator and cutting points 81 cut into the valve operator to form the valving wall. The cutting tool is advanced along its axis in the direction indicated by arrow 84 until polygonal face 80 has passed through center point 75 and the desired major radius indicated by dashed line 85 has been formed. This radius can be accurately determined from the axial position of shaft 77 since the major radius is equal to the distance between the cutting points 81 and center point 75.

The cutter radius, indicated by dashed lines 86, defines the size of torodial valving wall 37 in the direction parallel to axis 22 of the valve operator. The cutter radius is at least as long as the radius of the contact surface of the valving tube which is intended to abut the valving wall.

After torodial surface 37 has been formed in the valve operator, valving port 38 as illustrated in FIGS. 5 and 6 may be cut through the valving wall.

This method is preferred since it produces a smooth toroidal surface with a minimum of cutting pressure. It has been found that forming a larger part of the surface at once, such as by a form tool whose teeth make contact along a substantial part of their length, provide a poorer surface finish and less accurate surface. In this method, because cutting is done only at the edge, generating a minimum area at a given time, less disruptive forces are exerted on the tool and the part and a better part is made.

Figure 13:
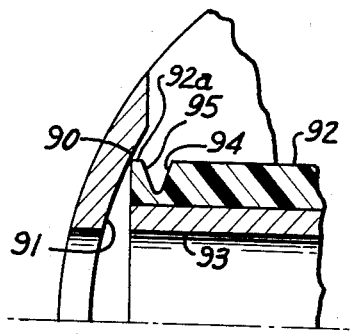

FIG. 13 illustrates a modification of the seal or contact surface. Contact surface 90, which is congruent with valving wall 91, is formed at the end of valving tube 92 as in FIG. 1. Typically, although not necessarily, valving tube 92 may be fitted over valve extension tube 93. The external periphery of valving tube 92 carries an annular wedge-shaped groove 94 near contact surface 90 and in communication with the valving cavity. Lip 92a is formed between the contact surface and the groove. Fluid pressure in the valving cavity operates on face 95 of groove 94 to bias lip 92a and contact surface 90 toward valving wall 91. Such an arrangement assures full peripheral contact of contact surface 90 with the valving wall.

Figure 14:
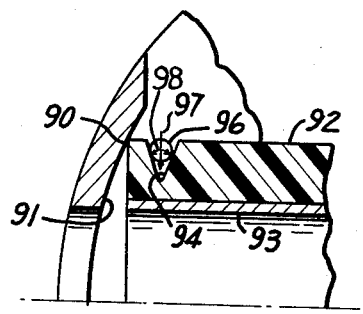

FIG. 14 illustrates a modification of FIG. 13. In addition to the fluid pressure's operating on face 95, a compression ring 96 is placed in groove 94 to constrict the tube, and to widen the groove, thereby pressing the end of the tube in better contact with the valving wall. Compression ring 96 presses inwardly in the direction of arrow 97 causing pressure to bear against the groove in the direction of arrow 98, thereby further biasing the contact surface and lip.

As can best be seen in FIGS. 2 and 3, the valving tube of FIG. 1 is slidable relative to tube 25 and is biased toward the valving wall by a waffle spring 46. This maintains a positive contact between the valving wall and contact surface 28.

As an alternative to this bias technique, pressure may be used for the purpose as best shown in FIG. 9 wherein a valving tube 47 is shown slidably fitted inside tube 25 which is modified with a counterbore 48 and an O-ring seal 49. Valving tube 47 includes a step 50 and this step is in fluid contact through a clearance 51 with pressure inside the relieved portion of the valve operator. The pressure of the fluid in the cavity applies pressure to step 50 through clearance 51, thereby biasing the valve tube toward the left and into full peripheral contact with the valving wall.

Still another alternative to the above bias techniques is shown in FIG. 10. Tube 60 is mounted within the body and has an external annular flange 61 between its two ends. Retainer nut 62 is threaded onto the body to retain coil spring 63 between face 64 of the retainer and flange 61 on the tube. Valving tube 65 is fitted over the opposite end of tube 60 and bears against step portion 61. Spring 63 biases tubes 60 and 65 toward the left (as shown in the drawings) so that contact surface 28 at one end of valving tube 65 is in full peripheral contact with valving wall 24. O-ring seal 49 provided a fluid seal between the body and sliding valving tube 65.

Figure 11:
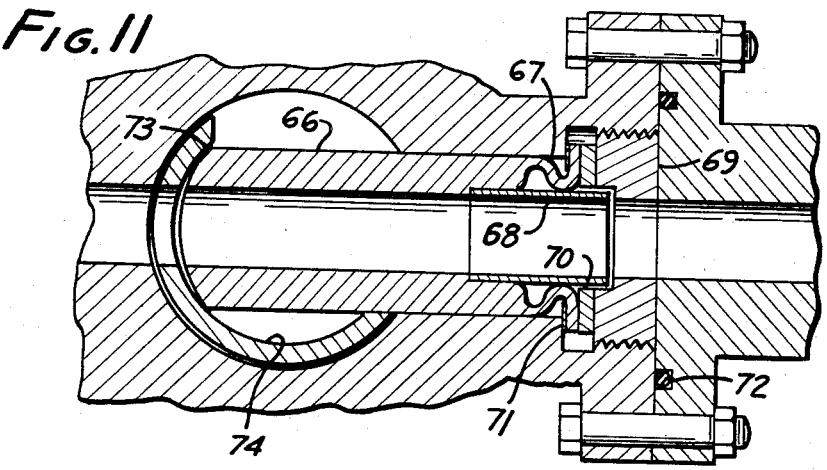

As yet another alternative biasing technique, there is shown in FIG. 11 a valving tube 66 mounted within the body that has a resilient accordion or bellows section 67 at one end. An internal sleeve 68 is mounted to the valving tube so as to support the bellows section. A retainer nut 69 is threaded into the body and a spacer ring 70 is held in contact between the retainer and the bellows section of the valving tube. The bellows section biases the valving tube to the left so that contact surface 73 at one end of the valving tube is in full bearing contact with valving wall 74.

Surface 71 of the retained portion of the bellows section is plated with a metal, preferably a readily deformed metal with a relatively high melting point. A suitable example is metallic copper plated to a thickness of about 0.002 inches. Other metals can be used for this purpose provided they have the necessary physical properties. Such an arrangement provides a reliable fluid-tight seal between the bellows and the body.

High temperature valves are likely to experience an operating temperature range on the order of 800 to 1000 Farenheit degrees, and often more. Temperature changes alter relative geometrical relationships, and high temperatures destroy many types of seals. The arrangement illustrated in FIG. 11 utilizes a metal seal which is resistant to high temperatures, and a resilient metal accordion or bellows section which provides a bias force on the valving tube regardless of the temperature of the fluids flowing through the valve, and which permits the tube to move axially through substantial distances to remain in contact with the valving wall.

Fluid under pressure in the upstream side of the valve, for example in the valving cavity defined by valving wall 74, cannot leak past the seal between surface 71 and the body. Seals are not necessary between the bellows section and the spacer or between the spacer and the retainer nut as only downstream fluid could leak past these points, and only this fluid can leak back to the downstream conduit. If desired, a suitable seal 72 may be placed between the valve body and the contiguous assembly to prevent leakage of downstream fluids to the atmosphere.

Figure 12:
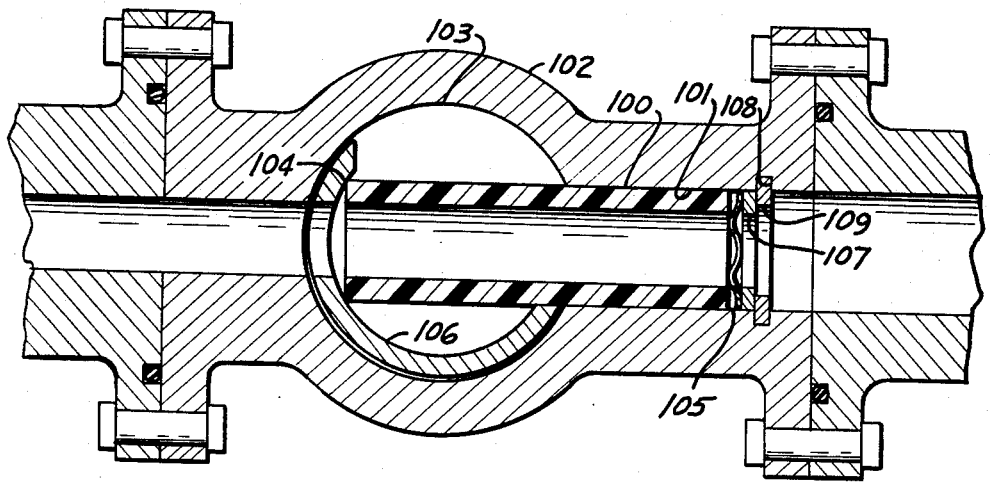

FIG. 12 illustrates another alternative biasing technique wherein the valving tube is directly biased by a spring and requires no valve extension tube for support. This arrangement reduces the size and complexity of the valve and reduces the number of operations needed to assemble it. Valving tube 100 is inserted within axial passage 101 through one side of body 102 and projects into cavity 103. Valving tube 100 carries contact surface 104 which is biased by waffle spring 105 into full peripheral contact with valving wall 106 of the valve operator in the cavity. Waffle spring 105 is backed up by a spacer 107 which in turn is backed up by a snap ring 109 which snaps into an internal groove 108.

The valve is readily assembled by inserting the valve operator into cavity 103 and passing the valving tube through passage 101 until contact surface 104 abuts valving wall 106 on the valve operator. Waffle spring 105 and spacer 107 are inserted into the passage and held in place by snap ring 109. The waffle spring biases the valving tube to the left (as shown in the drawing) so that contact surface 104 is held in full peripheral contact with valving wall 105. A comparison with FIG. 2 shows the simplification of construction achieved by this configuration.

Figures 17, 18, 19:
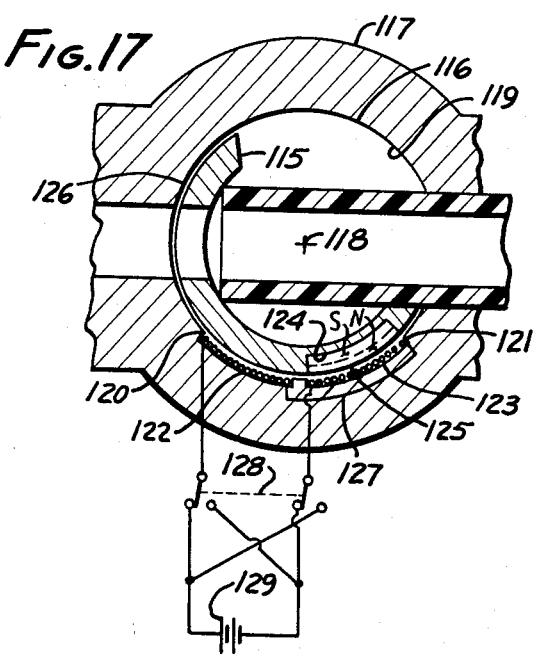
FIG. 17 is a fragmentary axial cross-section showing another modification of the device of FIGS. 1 and 2.
FIG. 18 is a side elevation of a modification of the valve operator in FIGS. 5 and 6.
FIG. 19 is a left hand elevation of FIG. 18.

As an alternative to a manually operated valve operator, the valve operator may be magnetically operated as best shown in FIG. 17. The magnetic control of the position of the valve operator is particularly advantageous in applications where the valve is to be operated by remote control, for example where the valve is in an inaccessible location. Valve operator 115 is rotatably mounted within cavity 116 of body 117. Valve operator 115 rotates about axis 118 (perpendicular to the plane of the drawing). Wall 119 of body 117 carries a pair of recessed portions 120 and 121, each containing electrical windings 122 and 123, respectively. Windings 122 and 123 are oppositely wound so that when direct current flows in one direction through winding 122, direct current will flow in the opposite direction through winding 123. Windings 122 and 123 act as opposite poles of an electromagnet, and depending on the direction of current flow through the windings, one winding will act as a north pole while the other winding will act as a south pole.

Valve operator 115 carries a recessed portion 124 containing permanent magnet 125. In the open position of the valve operator, as illustrated in FIG. 17, permanent magnet 125 is adjacent winding 123, while in the closed position of the valve operator permanent magnet 125 is adjacent winding 122.

Permanent magnet 125 has a north and a south pole, one of which is flush with outer wall 126 of the valve operator, for example the north pole of magnet 125 is illustrated flush with the outer wall in FIG. 17. One end of each of windings 122 and 123 is connected by lead 127 so that current flows in opposite directions in the windings. The opposite ends of the windings are connected to reversing switch 128, and thence to battery 129, or any suitable source of direct current.

When switch 128 is in the position illustrated in FIG. 17, current flows through windings 122 and 123 so as to create a magnetic field around the windings. The windings act as an electromagnet and a north magnetic pole is formed around winding 122 while a south magnetic pole is formed around winding 123. Since opposite poles attract and like poles repel, the north magnetic pole of permanent magnet 125 on the valve operator is attracted to the south magnetic pole formed by winding 123, and the valve operator assumes the position illustrated in FIG. 17.

When switch 128 is placed in the opposite position from that illustrated in FIG. 17, the battery potential is reversed on the windings and current flows in an opposite direction through the windings. While switch 128 is in the opposite direction, a south magnetic pole is created at winding 122 and a north magnetic pole is created at winding 123. The north pole of permanent magnet 125 is repelled by the north pole created by winding 123, and is attracted to the south pole created by winding 122. The valve operator therefore rotates about axis 118 until the north pole of permanent magnet 125 is adjacent to the south pole created by winding 122. The valve operator is now in a closed position.

To move the valve operator back to an open position, switch 128 is moved to its original position illustrated in FIG. 17, and the magnetic poles change to the conditions illustrated.

It is understood there may be numerous variations of the magnetic operations, for example, an electromagnet may be used in place of permanent magnet 125. Further, if a reversible electromagnet is used on the valve operator, a permanent magnet may be used on the valve body instead of windings 122 and 123. Further, it may be desirable to provide a single electromagnet winding to move the valve operator to one position and rely on a spring bias to return the valve operator to the other position when the electromagnet is de-energized. The arrangement illustrated in FIG. 17 is advantageous since it permits positive control over the position of the valve operator instead of relying on a spring bias.

FIGS. 18 and 19 illustrate a modification of the valve operator of FIGS. 5 and 6 wherein O-ring grooves 130 and 131 are obliquely oriented in external peripheral wall 36 and receive suitable O-rings (not shown). This orientation of the O-ring grooves, oblique to axis 22, permits balancing of valve operator 21 to provide a true fit between the valve operator and the valve housing, thereby substantially preventing leakage between the valve operator and the valve housing. Valving port axis 132 is shown perpendicular to the plane of FIG. 18 and in the plane of FIG. 19. It is preferred that the plane of orientation of each O-ring groove is parallel to axis 132 and has a maximum axial excursion from axis 132 along axis 22 adjacent the opening in valve operator 21 which forms valving wall 37, and a minimum axial excursion 180° from the maximum excursion.

FIG. 2 also illustrates the fact that auxiliary equipment such as a check valve 55 can be connected to this valve so as to extend its utility.

The operation of the device should be evident from an inspection of FIGS. 2 and 3. In FIG. 2, the valve is open, the valve operator having been turned so that valving port 38 and contact surface 28 are aligned. Therefore, fluid can flow through the valve, which is shown fully opened. FIG. 3 illustrates the closed condition of the valve in which the valve operator has been rotated 90° so that valving port 38 has been moved away from registration with the contact surface 28 of the tube.

No special attempt is made to seal inlet port 17. Instead, a clearance 56 exists which can bypass around the valve operator and press upon the outside of the valving tube so as to bias the same against the valving wall. The internal region within the contact surface 28 is, of course, vented so that this constitutes positive pressure tending to keep the seal firmly closed. This is further assisted by the bias of waffle spring 46 or, in the case of FIG. 9, by the fluid bias. In FIG. 10, the positive pressure is assisted by said spring 63, and in the case of FIG. 11, by bellows section 67. In FIGS. 13 and 14, the positive contact between the seal and the valving wall is further assisted by a lip formed by annular groove 94. In FIG. 14, the compression ring 96 aids in expanding the groove.

It will therefore be seen that the device is self-sealing. There is no area which is biased to open the valve, but instead all are biased to close the same. All seals are maintained by such common expedients as O-rings and the like which are simply designed and maintained. It will also be understood that intermediate opening settings may be made wherein the contact surface 28 only partially overlays valving port 38, and an intermediate flow rate occurs.

The congruent surface 28 and valving wall 37, which are circular and a development of a circular arc, are among the simplest which can be conceived. However, one can appreciate from FIGS. 7 and 8 extensions of other surfaces of revolution and congruent surfaces whose congruency will be maintained when the surface of revolution itself is rotated.

The valve illustrated in FIG. 11 is highly suitable for high temperature valves likely to experience a wide operating temperature range. The readily deformable metal seal provides a reliable fluid-tight seal, and the bellows section provided is resistant to high temperatures and provides a bias force regardless of the operating temperature of the fluid.

The valve illustrated in FIG. 12 is a simple but highly effective valve, which is easily manufactured and assembled. The arrangement illustrated in FIG. 12 reduces the size and complexity of the valve and reduces the number of operations necessary for assembly.

The magnetically-operated valve operator illustrated in FIG. 17 is highly desirable in applications where the valve is to be operated by remote control, for example in the case where the valve is in an inaccessible location.

The method illustrated in FIGS. 15 and 16 provides a smooth toroidal surface for contact by the full periphery of the seal on the valving tube. The method requires less force than prior cutting methods and produces a better contact surface than has heretofore been possible by ordinary cutting methods.

This device therefore provides a simple valve whose valving action is just as positive at one pressure as at another pressure, which is easily assembled, and which can be manufactured to relatively loose tolerances.

This invention is not to be limited by the embodiments shown in the drawings and described in the description, which are given by way of example and not of limitation, but only in accordance with the scope of the appended claims.

I claim:

1. A valve comprising: a body having a cavity, an inlet port and an outlet port passing through said body into said cavity; a valve operator rotatably mounted in said cavity around an axis of rotation; a peripheral wall on said operator; a valving wall bounding a cavity in said peripheral wall, at least a portion of said valving wall being a concave surface of revolution centered on said axis of rotation; a valving tube extending from one of said ports into said valving cavity, said valving tube mounted in said body, said tube having a passage in fluid communication with said port; a valve seal on said valving tube, said seal having a continuous peripheral contact surface which is congruent to and continuously in contact with said portion of the valving wall in all permissible angular positions of the valve operator; and a valving port entering the valving cavity through the peripheral wall and the valving wall, whereby rotating the valve operator selectively connects or interconnects the valving port and the region bounded by the continuous peripheral contact surface whereby to control flow from the inlet port to the outlet port.

2. A valve according to claim 1 in which a clearance is provided between the peripheral wall of the valve operator and the bounding wall of the cavity, there being axially spaced apart seals interconnecting the two walls whereby inlet pressure is exerted on both sides of the valve operator except at that region which is bounded by the seal at the time when the valve is closed.

3. A valve according to claim 1 in which the seal is formed at the end of an axially-reciprocable valving tube, said valve further including a valve extension comprising a tube mounted to and in said body, said valving tube being mounted to said valve extension, and bias means being provided to bias the valving tube against the said valving wall.

4. A valve according to claim 3 in which the bias means comprises a spring.

5. A valve according to claim 3 in which the bias means comprises a fluid piston.

6. A valve according to claim 3 further including an external wedge-shaped slot on said valving tube adjacent the end of said tube where said seal is formed and in communication with said valving cavity.

7. A valve according to claim 6 further including a compression ring in said slot.

8. A valve according to claim 1 in which the valving wall is generated by a circular arc rotated around the center of revolution of the valve operator and in which the seal is a circle lying in a single plane.

9. A valve according to claim 1 in which the valving wall is cylindrical and in which the seal is a warped plane.

10. A valve according to claim 1 in which a check valve is fluidly connected to one of said inlet or outlet ports.

11. A valve according to claim 1 in which said valving tube is an axially reciprocable tube, said seal being formed at the end of said valving tube, and bias means provided to bias the seal against said valving wall.

12. A valve according to claim 11 in which the bias means comprises a spring.

13. A valve according to claim 11 in which the bias means comprises a bellows section on said valving tube, retainer means being provided to retain a portion of said bellows section to said body.

14. A valve according to claim 13 wherein said portion of said bellows section has a deformable metal surface providing a fluid seal between said portion of the bellows section and said body.

15. A valve according to claim 14 wherein the deformable metal surface on the portion of the bellows section is copper.

16. A valve according to claim 11 wherein said body has a passage between one of said ports and said cavity, said valving tube being slidably mounted in said passage, said bias means being mounted in said passage, said valve further comprising a compression ring mounted to said body and extending into said passage, said compression ring retaining said valving tube and said bias means in said passage.

17. A valve according to claim 16 in which the bias means comprises a spring.

18. A valve according to claim 1 further including electromagnetic means for rotating said valve operator about said axis.

19. A valve according to claim 18 wherein said electromagnetic means comprises first magnetic means connected to said body adjacent to said valve operator and second magnetic means connected to said valve operator, one of said magnetic means comprising an electromagnet winding adapted to be energized by electrical energy to produce a magnetic field.

20. A valve according to claim 18 wherein said electromagnetic means comprises a first electromagnetic winding mounted to said body at a first angular position adjacent to said valve operator and a second electromagnetic winding mounted to said body at a second angular position adjacent to said valve operator, said first and second electromagnetic windings being adapted to be energized by a source of direct current to create opposite magnetic poles, a permanent magnet mounted to said valve operator having one pole adapted to be positioned in one angular position and moved to the other of said angular positions, whereby when said electromagnetic windings are energized with a direct current in one direction through the windings, said permanent magnet is attracted to a position adjacent one of said electromagnetic windings thereby rotating said valve operator to said first angular position, and when said electromagnetic windings are energized with a direct current in the opposite direction through the windings, said permanent magnet is attracted to a position adjacent the other of said electromagnetic windings thereby rotating said valve operator to said second angular position.

21. A valve according to calim 1 further including seal means mounted to said peripheral wall obliquely oriented to the axis of rotation of said valve operator, said seal means providing a fluid seal between said valve operator and said body.

References Cited

UNITED STATES PATENTS

| | | | |
|---|---|---|---|
| Re. 24,102 | 12/1955 | Ohls | 251—172 |
| 1,947,071 | 2/1934 | Walton | 251—172 |
| 2,534,477 | 12/1950 | Prout | 251—172 |
| 2,777,664 | 1/1957 | Bryant | 251—174 |
| 2,883,147 | 4/1959 | Mirza | 251—159 X |
| 2,977,987 | 4/1961 | Maynard | 251—172 X |
| 3,220,694 | 11/1965 | Eschbaugh | 251—309 X |
| 3,314,643 | 4/1967 | Sachnik | 251—309 |
| 3,350,055 | 10/1967 | Campbell | 251—172 X |

CLARENCE R. GORDON, *Primary Examiner.*

PO-1050
(5/69)

UNITED STATES PATENT OFFICE
CERTIFICATE OF CORRECTION

Patent No. __3,404,864__          Dated __October 8, 1968__

Inventor(s) __ROBERT R. REDDY__

It is certified that error appears in the above-identified patent and that said Letters Patent are hereby corrected as shown below:

Column 8, line 33, "interconnects" should read

--disconnects--

Signed and sealed this 16th day of May 1972.

(SEAL)
Attest:

EDWARD M. FLETCHER, JR.          ROBERT GOTTSCHALK
Attesting Officer                 Commissioner of Patents